(12) United States Patent
Wise et al.

(10) Patent No.: US 7,373,557 B1
(45) Date of Patent: May 13, 2008

(54) PERFORMANCE MONITOR FOR DATA PROCESSING SYSTEMS

(75) Inventors: Ashley K. Wise, Zimmerman, MN (US); David A. Bjur, Oak Grove, MN (US)

(73) Assignee: Unisys Corporation, Blue Bell, PA (US)

( * ) Notice: Subject to any disclaimer, the term of this patent is extended or adjusted under 35 U.S.C. 154(b) by 584 days.

(21) Appl. No.: 10/407,291

(22) Filed: Apr. 4, 2003

(51) Int. Cl.
*G06F 11/00* (2006.01)

(52) U.S. Cl. .................................... 714/47
(58) Field of Classification Search ............ 714/47; 702/364–554; 370/252
See application file for complete search history.

(56) References Cited

U.S. PATENT DOCUMENTS

| | | | |
|---|---|---|---|
| 3,818,458 A | 6/1974 | Deese | |
| 4,034,353 A | 7/1977 | Denny et al. | |
| 4,166,290 A * | 8/1979 | Furtman et al. | 714/47 |
| 4,231,106 A * | 10/1980 | Heap et al. | 702/186 |
| 4,367,525 A * | 1/1983 | Brown et al. | 710/18 |
| 4,458,309 A | 7/1984 | Wilder, Jr. | |
| 4,521,849 A | 6/1985 | Wilder, Jr. | |
| 4,590,550 A | 5/1986 | Eilert et al. | |
| 4,623,984 A | 11/1986 | Yokokawa et al. | |
| 4,654,848 A | 3/1987 | Noguchi | |
| 4,821,178 A | 4/1989 | Levin et al. | |
| 4,905,171 A | 2/1990 | Kiel et al. | |
| 5,023,791 A * | 6/1991 | Herzberg et al. | 701/35 |
| 5,051,944 A | 9/1991 | Fetterolf et al. | |
| 5,062,055 A | 10/1991 | Chinnaswamy et al. | |
| 5,067,107 A | 11/1991 | Wade | |
| 5,123,017 A | 6/1992 | Simpkins et al. | |
| 5,166,890 A | 11/1992 | Smischny | |
| 5,193,179 A | 3/1993 | Laprade et al. | |
| 5,210,862 A | 5/1993 | DeAngelis et al. | |
| 5,245,638 A | 9/1993 | Gustafson | |
| 5,276,809 A | 1/1994 | Chisvin et al. | |
| 5,515,501 A | 5/1996 | LaBerge et al. | |
| 5,572,672 A * | 11/1996 | Dewitt et al. | 714/47 |
| 5,577,259 A | 11/1996 | Alferness et al. | |
| 5,581,482 A * | 12/1996 | Wiedenman et al. | 702/186 |
| 5,696,701 A * | 12/1997 | Burgess et al. | 714/25 |
| 5,745,915 A | 4/1998 | Cooper et al. | |
| 5,758,149 A | 5/1998 | Bierma et al. | |
| 5,784,382 A | 7/1998 | Byers et al. | |

(Continued)

OTHER PUBLICATIONS

Literature from Hewlett Packer, "Logic Analyzers State and Timing Analysis Modules HP 16510B, 16511B", 4 pages.

(Continued)

*Primary Examiner*—Robert Beausoliel
*Assistant Examiner*—Amine Riad
(74) *Attorney, Agent, or Firm*—Charles A. Johnson; Robert Marley; Crompton, Seager & Tufte, LLC (57) ABSTRACT

A portable scalable performance monitoring system is provided for monitoring the performance of one or more data processing systems in real time. The portable scalable performance monitoring system may include data capture and control mechanisms such as data sampling, data selection, data buffering, and data communication to facilitate the monitoring of the one or more data processing systems in real or near real time. Furthermore, the portable scalable performance monitoring system may include multiple levels of data collection and control to increase scalability.

10 Claims, 7 Drawing Sheets

U.S. PATENT DOCUMENTS

| | | | |
|---|---|---|---|
| 5,796,939 A * | 8/1998 | Berc et al. ................... 714/47 |
| 5,796,972 A | 8/1998 | Johnson et al. |
| 5,832,310 A | 11/1998 | Morrissey et al. |
| 5,864,738 A | 1/1999 | Kessler et al. |
| 5,867,699 A | 2/1999 | Kuslak et al. |
| 5,875,119 A | 2/1999 | Bauman et al. |
| 5,913,036 A * | 6/1999 | Brownmiller et al. ...... 709/224 |
| 5,917,485 A | 6/1999 | Spellman et al. |
| 5,924,097 A | 7/1999 | Hill et al. |
| 5,970,439 A * | 10/1999 | Levine et al. ............... 702/186 |
| 6,003,145 A | 12/1999 | Hong |
| 6,012,148 A | 1/2000 | Laberge et al. |
| 6,055,493 A * | 4/2000 | Ries et al. ................... 702/186 |
| 6,065,138 A | 5/2000 | Gould et al. |
| 6,101,531 A | 8/2000 | Eggleston et al. |
| 6,167,538 A * | 12/2000 | Neufeld et al. ............... 714/47 |
| 6,233,531 B1 * | 5/2001 | Klassen et al. ............... 702/80 |
| 6,282,173 B1 * | 8/2001 | Isonuma et al. ............ 370/242 |
| 6,349,394 B1 * | 2/2002 | Brock et al. .................. 714/47 |
| 6,351,724 B1 * | 2/2002 | Klassen et al. ............. 702/186 |
| 6,405,327 B1 * | 6/2002 | Sipple et al. ................. 714/39 |
| 6,467,052 B1 * | 10/2002 | Kaler et al. ................... 714/39 |
| 6,499,028 B1 * | 12/2002 | Brock et al. .................. 707/4 |
| 6,530,042 B1 * | 3/2003 | Davidson et al. ............. 714/47 |
| 6,748,558 B1 * | 6/2004 | Gonzales et al. ............. 714/47 |
| 6,751,573 B1 * | 6/2004 | Burch ........................ 702/178 |
| 6,802,032 B1 * | 10/2004 | Budinger et al. ............. 714/46 |
| 6,853,955 B1 * | 2/2005 | Burrell et al. ................ 702/182 |
| 2003/0051194 A1 * | 3/2003 | Cabezas et al. ............... 714/43 |
| 2005/0090993 A1 * | 4/2005 | Sunshine .................... 702/21 |

OTHER PUBLICATIONS

Harden, J., et al. "A Performance Monitor for the MSPARC Multicomputer", *IEEE*, 1992, pp. 724-729.

Gray, George, "Getting Started in 1100/2200 Performance Monitoring", 1993, pp. 31-35 and 64.

* cited by examiner

*Prior Art*

*Prior Art*

PERFORMANCE MONITOR FOR DATA PROCESSING SYSTEMS

BACKGROUND

The present invention is related to the field of data processing systems, and more particularly, to performance monitoring of data processing systems.

The term "performance monitoring" refers to monitoring the performance of various system components within a data processing system, preferably while the data processing system is operating under normal operating conditions. Performance monitoring can be an important factor in the operation, analysis and maintenance of many of today's complex computer systems.

In the past several decades, the demand on computer systems has steadily increased. Today's software packages require much more processing power and storage capacity than those produced just a few years ago. In addition, many more people are using computers to do tasks that were traditionally done using other means. Because computer systems remain relatively expensive to purchase and maintain, many end users are operating their computer systems at a much higher capacity than in the past. This increased demand results in a higher probability that performance issues will occur in a given system.

Many factors may reduce the optimal performance of a computer system. For example, there may be a bottleneck at the input/output interface causing the Central Processing Unit (CPU) to become idle a substantial portion of time waiting for data. In another example, the users of a system may routinely execute a particular computer program. If the system is not configured properly, the system may need to load the computer program from an external disk into internal memory each time the program is executed, thereby unnecessarily slowing down system performance. In this example, system performance could be increased by recognizing that this is occurring, preferably by using one or more performance monitoring techniques, and changing the system's configuration to keep the particular computer program in the computer's internal memory during peak usage periods. In yet another example, there may not be enough internal memory within the computer system to store all of the computer programs that are to be simultaneously executed by the users. This can result in memory transfers, such as "disk swapping", which occur when internal memory limitations require a computer program or the resulting data from the computer program to be loaded and unloaded from an external storage, such as disk, each time a process or thread becomes active. Disk swapping can especially be a problem in multi-user systems and systems that use re-entrant computer programs, for example.

The above examples are given only to illustrate the desire for performance monitoring techniques within a computer system and are not intended as an exhaustive list. It is recognized that many other performance inhibitors exist in modern computer systems and that many of them may be detected by using performance monitoring techniques.

Another, motivation for monitoring the performance of a computer system is to debug a particular system during system development or to debug a particular software program during software development. Often it is unknown where the bottlenecks are likely to occur within a computer system or software program that is under development. Performance monitoring techniques can be used to produce data that can be analyzed to provide computer designers and software developers insight into where future bottlenecks or problems may occur.

Performance monitoring of today's computer systems is typically provided by using off-the-shelf software packages. Examples of such off-the-shelf performance monitoring software packages include: CMF baseline; the Torch program available from Datametrics; the SIP Database written by Structural Metals Inc. and available through the USE Program Library Interchange (UPLI); the ALICE module of the SYSTAR products; and the Online System Activity Monitor (OSAM) available from TeamQuest. These software packages are typically executed on a single computer and generate performance data based on a number of pre-selected factors. One such method is discussed in "Getting Started in $^{1100}/_{2200}$ Performance Monitoring", by George Gray, UNISPHERE Magazine, November 1993.

These off-the-shelf software packages may prove to be useful for some users, but they are not ideal solutions for others. Problems that exist with many of these software packages include: (1) only the performance parameters selected by the software developer are available to the user; (2) the software packages are typically only available for standard computer systems and therefore cannot be used during the development stage of a computer system or on less known computer systems without independent development of the performance monitoring software; (3) the software packages are typically run concurrently with and on the same CPU as the user software and therefore may slow down systems performance while the performance monitoring software is executed; and (4) only hardware that is accessible by the software package, like CPU activity and I/O requests, can be monitored.

Problems (1) and (2) listed above may be minimized by having the user write a customized performance monitoring software package for the user's system. However, a significant investment in resources is often required to develop such a program. Problems (3) and (4) listed above cannot typically be eliminated by having the user write a customized software package for several reasons. First, only the nodes within the computer system that are accessible to the performance monitoring software can be monitored. This limitation is a result of having the performance monitoring strategy determined after the computer hardware is designed. Many nodes within a computer system are neither controllable nor observable via software. Second, the performance monitor software is often run on the same CPU as the user programs, and therefore may affect the performance of the system in which the software is attempting to measure. This may degrade the overall accuracy of the results obtained by the performance monitoring software packages.

SUMMARY

The present invention provides methods and apparatus for monitoring the performance of one or more data processing systems. In one embodiment, a monitored computer is equipped with one or more access elements that provide access to selected nodes in the one or more data processing systems and to provide performance monitoring data. The access elements may be part of the original monitored computer, or retrofitted into a monitored computer. The one or more access elements are then placed in communication with a separate monitoring computer or device. The monitoring computer or device may receive, record and/or analyze the data provided by the one or more access elements. Preferably, the monitoring computer or device monitors the performance of more than one monitored computer or data processing system, but this is not required in all embodiments.

In some embodiments, one or more capture devices are provided between the one or more access elements and the monitoring computer. The one or more capture devices may, for example, help buffer the data provided by the access elements before the data is sent to the monitoring computer. The one or more capture devices may include or be coupled to one or more communications devices that may be used to help establish and/or control communication of data between the one or more capture devices and the monitoring computer. It is contemplated that the one or more capture devices may be included with, or separate from, the access elements. In some embodiments, multiple access elements may be coupled to a common capture device and/or communications device to provide one level of scalability, and multiple capture devices and/or communications devices may be coupled to the monitoring computer, providing another level of scalability.

In some embodiments, the monitoring computer is a portable computer such as a laptop or the like, but this is not required in all embodiments. In a preferred embodiment, the capture devices, communications devices and/or the monitoring computer may be portable devices that can be brought into a site by computer service personnel to monitor the performance of various computer systems and/or various computer system parts simultaneously, as desired.

In some embodiments, the capture devices may include a sampling device for sampling the performance monitoring data provided by the access elements prior to providing the performance monitoring data to the monitoring computer. The capture device may also include a selector for selecting performance monitoring data from certain access elements. Control signals may be provided from the monitoring computer to the capture devices to control and/or provide control criteria for the various functions of the capture devices. For example, the control signals may identify selected sampling criteria such as a sampling interval, one or more event triggers that define the beginning or end of a sampling interval, the format of the desired sampled data, etc. Likewise, the control signals may identify certain access elements from where performance monitored data is desired.

DETAILED DESCRIPTION

The following detailed description should be read with reference to the drawings. The drawings, which are not necessarily to scale, depict illustrative embodiments and are not intended to limit the scope of the invention.

Figure 1A:
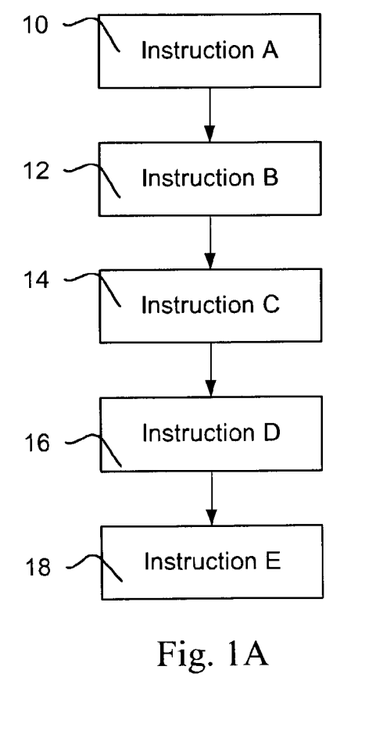
FIGS. 1A-1B are block diagrams for a prior art software based approach for performance monitoring.
Figure 1B:
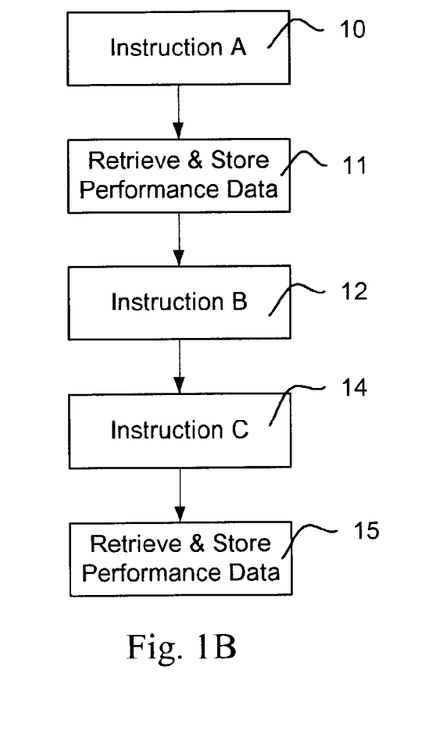

FIGS. 1A-1B are block diagrams showing a prior art software based approach for performing performance monitoring. A typical software program operates by performing a sequence of instructions. For example, FIG. 1A shows a program performing five instructions 10, 12, 14, 16, 18. In some prior art "software intrusive" methods of performance monitoring, the internal operations of a Central Processing Unit (CPU) are monitored by augmenting the user program. The user program of FIG. 1A may be augmented as shown in FIG. 1B. Thus, after augmentation, the user program no longer proceeds directly from instruction A 10 to instruction B 12. Instead, the augmented user program injects one or more instructions 11 that retrieve and store some performance data 11 to some defined memory location. This prior art method may allow a computer engineer, for example, to determine what values are being stored in certain monitored registers after instruction "A" is performed. Performance data may be stored several times during the execution of the user program, such as shown at steps 11 and 15 in FIG. 1B.

There are a number of disadvantages to the software intrusive approach shown in FIG. 1B. One disadvantage is that the steps 11 and 15 used for retrieving and storing performance data are performed by the CPU that is executing the user program, which may take time away from performing the core instructions 10, 12, 14. For example, assuming (as is often not the case) for purposes of illustration that each instruction takes one clock cycle, the augmented program shown in FIG. 1B only performs three instructions 10, 12, 14 in five clock cycles, while the user program shown in FIG. 1A would perform five instructions 10, 12, 14, 16, 18, in five clock cycles. Thus, the delays induced by augmenting the user program can slow the operation of the CPU in performing the core or actual program instructions. As can be seen, the instructions 11 and 15 that are added to monitor the performance of the CPU can affect the performance of the CPU.

Another difficulty is that the performance information that can be accessed and stored is often limited to data that can be accessed by the CPU. In some environments, relevant or desired data may not be accessible by the CPU. In other environments, relevant or desired data may only be accessed when the CPU is operating in a maintenance mode, for example, which may allow additional registers or nodes to be accessed. When desired data may not be accessed, performance monitoring may be incomplete. When the CPU must be run in a special mode to obtain relevant data, real time performance monitoring cannot be accomplished.

Figure 2:
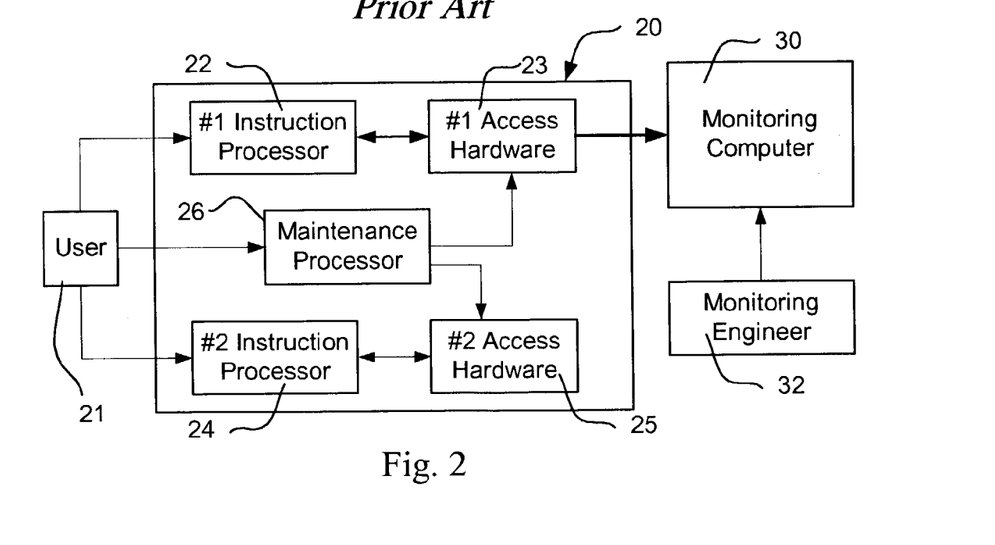
FIG. 2 is a schematic representation for a prior art hardware based approach for performance monitoring.

FIG. 2 is a schematic representation of a prior art hardware based approach for monitoring the performance of a computer system. The operating environment includes a multiprocessor machine 20 having two instruction processors (IP) 22 and 24, operated by a user 21. Machine 20 also includes a maintenance processor 26, which is also controlled by the user 21. Each IP 22 and 24 is connected to access hardware 23 and 25, respectively. Access hardware 23 and 25 are then controlled by the maintenance processor 26. In order to facilitate monitoring of the machine 20, a monitoring computer 30, controlled by a monitoring engineer 32, is coupled to the access hardware 23 for one IP 22. To access data from the other access hardware element 25, the monitoring computer must typically be physically disconnected from the access hardware element 23 and reconnected to access hardware element 25. In addition, the monitoring computer 30 is typically not given the option to control the access hardware 23 and 25.

Figure 3:
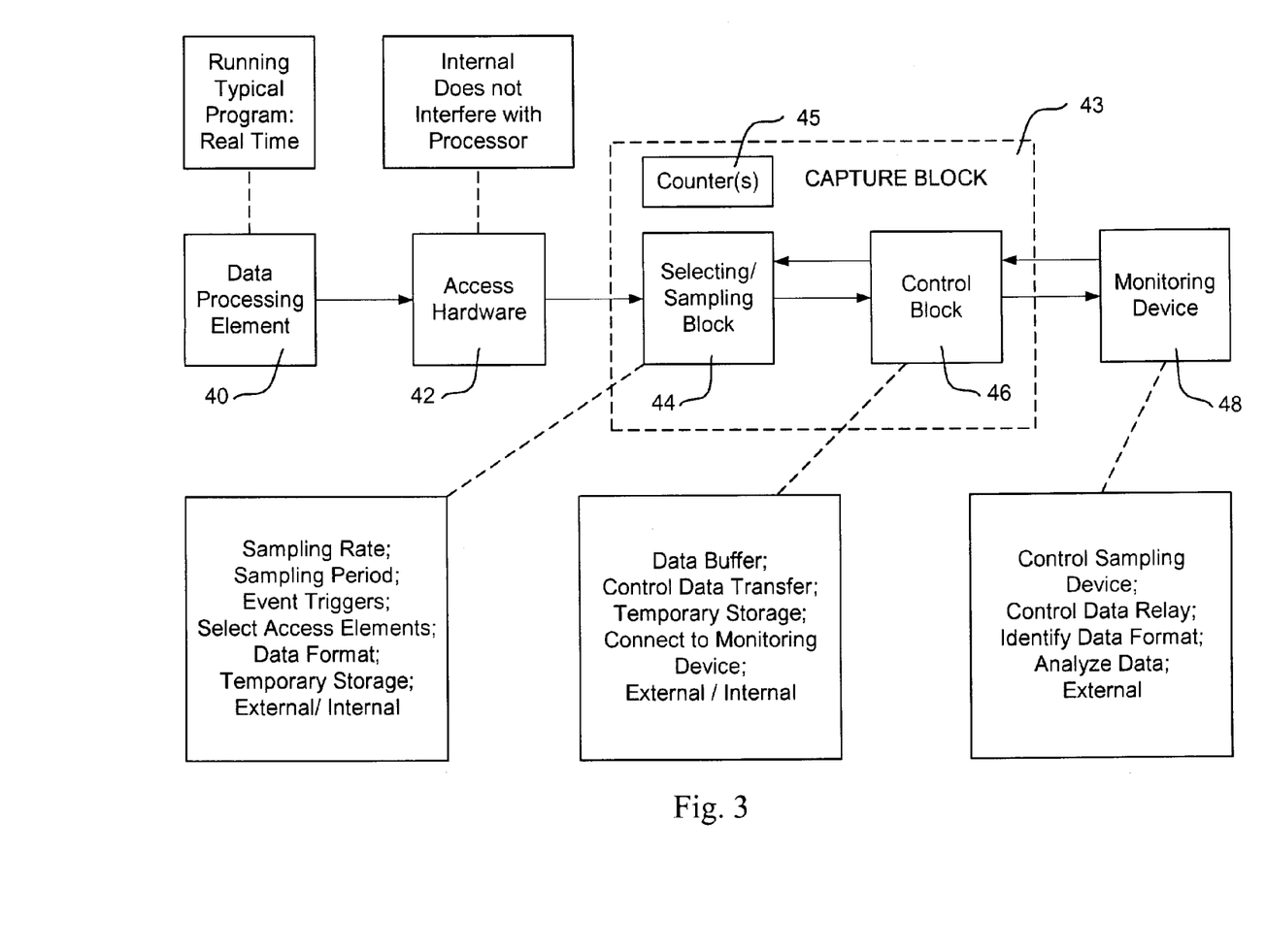
FIG. 3 is a block diagram showing an illustrative embodiment of the present invention.

FIG. 3 is a block diagram showing one illustrative embodiment of the present invention. A data processing element 40 is monitored using access hardware 42. Access hardware 42 may be as simple as a wire or other electrical connection path, or may include counters, multiplexers, comparators, and/or any other logic, as desired. Access hardware 42 is preferably configured to provide access to selected nodes within the desired hardware component to be monitored, such as data processing element 40. It is contemplated that the data processing element 40 may include one or more processors, as desired. While a data processing element 40 is shown in FIG. 3, it is contemplated that the present invention may be used to monitor the performance of virtually any hardware component or element including, for example, processors, cache memory, main memory, internal or external busses, I/O access, etc.

In the illustrative embodiment of FIG. 3, access hardware 42 is coupled to a capture block 43. The capture block 43 may perform a number of functions including, for example, buffering data, selecting data, sampling data, and/or communicating data to a monitoring computer or device 48, etc. In the embodiment shown, the capture block 43 includes a selecting/sampling block 44 and a control block 46.

FIG. 3 also illustrates several characteristics of each block 40, 42, 44, 46, 48. Several of the characteristics noted intentionally overlap, as the functions may vary from one embodiment to another, and the functions are not intended to be limiting as to the physical implementation or capabilities of any element. Such functions are shown for purely illustrative purposes. The data processing element 40 may run a software program, such that it is operating in real time and the system enables real time performance monitoring. The access hardware 42 provides access to selected electrical nodes within the data processing element 40 without interfering with the performance of the software program. Data processing element 40 may be fabricated to include the access hardware 42, or the access hardware may be retrofitted or coupled to selected nodes of the data processing element 40, as desired.

In some embodiments, the selecting/sampling block 44 of the capture block 43 may select and/or sample performance monitoring data provided by the access hardware 42. The selecting/sampling block 44 may include, for example, capabilities to determine sampling rate or sampling period, to select certain access elements to be monitored or used, to identify a trigger for a sample based on, for example, the format of the data coming from the access elements, to provide temporary storage, as well provide any other function suitable for monitoring the performance of data processing element 40. In some embodiments, the selecting/sampling block 44 may also determine which access hardware nodes or elements are to be monitored.

Some or all of the functions of the selecting/sampling block 44 may be controlled by the monitoring computer or device 48 in some embodiments. For example, the monitoring computer may instruct the control block 46 such that the selecting/sampling block 44 monitors a short sample trace at a given sampling interval, such as filling up to 8K worth of real time trace data, and then waiting until the trace data has been transferred to the monitoring computer, and then sampling another trace. In another example, the monitoring computer may notify the control block 46 of the format of the monitored data, such that the selecting/sampling block 44 triggers a sample at the appropriate time based on the format of the data. It is contemplated that these and other instructions may be provided by monitoring computer or device 48 to control the sampling of data, as desired.

In some cases, some functions may be, at least in part, controlled by events in the data processing element 40 itself. For example, the selecting/sampling block 44 may be configured to rely on the data processing element 40 clock to set a sampling rate. Likewise, the selecting/sampling block 44 may be configured to begin or end sampling after a certain instruction is performed by the data processing element 40, or after a certain memory location is accessed, or any other operation by the data processing element 40. Such events may be sensed by the selecting/sampling block 44 using the access hardware 42 which may, for example, determine whether a particular memory location is accessed by monitoring a pointer within the data processing element 40 and comparing the pointer to a masking value, for example.

The control block 46 may perform a variety of tasks, including, for example, buffering selected and sampled data, and controlling transfer of the data from the selecting/sampling block 44 to the monitoring computer or device 48. The control block 46 may also receive instructions from the monitoring computer, and provide control instructions to the selecting/sampling block 44, as described above.

Control block 46 may also provide some connection, for example an electrical, optical or wireless transmission connection, to transfer data to the monitoring computer or device 48. The control block 46 may be provided internally, for example, by providing control block 46 as part of the same unit as the data processing element 40, or more preferably externally by connecting to the selecting/sampling block 44. In another embodiment, the control block 46 may be partly internal, including a port having connections and memory elements disposed in the same unit as the data processing element 40, as well as a wire, cable or antenna that is separate or separable from the data processing element 40. Control block 46 may include, for example, a radio transmission and reception system for wirelessly exchanging data with the monitoring computer or device 48, a USB port and cable, a coaxial cable, or other parallel or serial data transmission connections including an optical fiber with light emission and reception devices, as desired. Thus, the control block 46 may provide a communications interface between the selecting/sampling block 44 and the monitoring computer or device 48.

It is contemplated that the control block 46 may provide either one way or two way communication with the monitoring computer or device 48. For example, the monitoring computer or device 48 may be adapted to send control signals for controlling the selecting/sampling block 44 and/or the control block 46. Such control data may be directly sent by the monitoring computer or device 48 to the selecting/sampling block 44, or may be sent to the control block 46, which may in turn send control data to the selecting/sampling block 44. Additionally, the control block 46 may exchange verification data with the monitoring computer or device 48, for example, to verify that performance data sent to the monitoring computer or device 48 is in a correct format or is correctly sent or received, or to determine whether the monitoring computer or device 48 is ready to receive data. The control block 46 may also provide status or data format to the monitoring device 48 so that, for example, the monitoring device 48 can be adapted to receive data in several distinct formats, and the control block 46 can provide information to the monitoring device 48 indicating the format of data being sent. In some embodiments, the control block 46 may be adapted to only send data to the monitoring computer device 48, and not receive data.

The control block 46 may further include or be adapted to function with, for example, a number of busses or hubs to allow for capture of data from more than one selection/sampling device 44 or data processing elements 40. FIGS. 5-8 illustrate several embodiments where scalability of a monitoring system in accordance with the present invention is facilitated in part by using a bus and/or a hub. Additionally, the control block 46 may include a multiplexing device or other selection apparatus or switch that may allow selection from among multiple input devices such as multiple selecting/sampling blocks 44, if desired.

The monitoring computer or device 48 may be, in some embodiments, a laptop or portable computer. In other embodiments, the monitoring device may be a desktop computer, a server, a PDA, or other data capture, storage or analysis devices. It is not necessary that the monitoring computer or device 48 be either a general purpose computer or a dedicated purpose device. Preferably, the monitoring computer or device 48 is external to the monitored data processing element 40, and the monitoring computer or device 48 may be adapted to receive and analyze different formats of data as well as be connectible to several different types of data processing elements 40, as desired.

The monitoring computer or device 48 may be adapted to control the selection/sampling block 44 and/or the control block 46, to determine or control the data format, and/or to store and/or analyze the data received. In some embodiments, the monitoring computer or device 48 is adapted to receive data from several different data processing elements 40 and may further be adapted to provide analysis of the performance of the several different data processing elements 40, as desired. In some embodiments, the monitoring computer or device 48 can display real-time performance related data, including graphs and/or charts for example, for real time performance analysis.

A variety of data may be provided to the monitoring device 48. Some examples of data that may be provided include instruction samples, hardware or software activity states, interrupt vectors and occurrences, address traces, user states, operation states, operation types, processor capacity and usage, pointer values, flag values, counter values, hits and misses for operands, number of writes, number of reads, instructions and insertions, values at various nodes, changes in values, rates of change, averaging functions, I/O access, and the like. The duration of wait states and other states or instructions may also be determined by providing, for example, a counter or counters to the selection/sampling block 44, within the access hardware 42 or at the monitoring computer. Further, some data may include results of logical operations performed between any of the above types of data.

In some embodiments, the average instruction execution time (AIET) is monitored for various instructions by using the methods and systems disclosed herein. AIET may be determined by, for example, determining when an instruction is called, and counting the number of clock cycles that occur before the instruction is completed. One illustrative method for doing so is to determine where in virtual memory a particular instruction begins, and monitoring a memory pointer to determine when the location that begins the instruction is accessed. A counter, such as counter 45, may be set or reset when the memory pointer accesses the location, and the counter 45 may be stopped once a second location corresponding to completion of the instruction is accessed, or, alternatively, when a software state indicating return from subroutine or instruction is performed (indicating the end of execution of the instruction by returning the program).

Data collection may be performed according to instructions given by a program run on the monitoring computer or device 48. In some embodiments, data collection is initiated and/or terminated in response to a user input, such that the monitoring computer or device 48 is used interactively. The monitoring device may be adapted to allow a user to select or deselect data elements, identify formats of interest, provide sampling criteria and other parameters, preferably dynamically during monitoring. In some embodiments, the monitoring computer or device 48 may include capabilities for providing a graphical user interface. For example, data captured using the present systems may be presented in a spreadsheet format, or in charts or graphs of various types, sometimes in real time in a graphical user interface (GUI), as desired.

Figure 4:
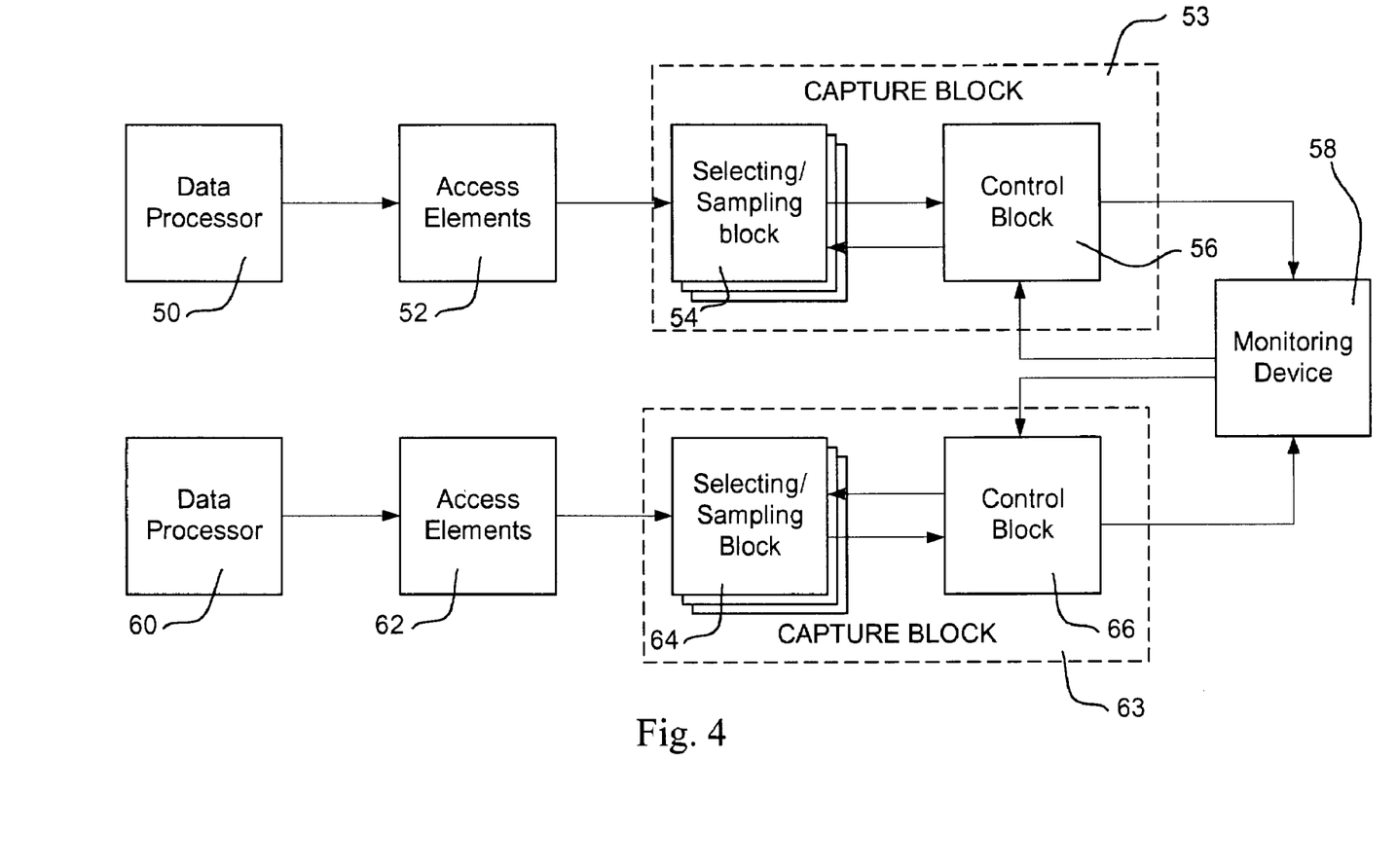
FIG. 4 is a block diagram showing another illustrative embodiment of the present invention.

FIG. 4 is a block diagram of an illustrative monitoring system with two data processors monitored. In the illustrative embodiment, a first data processor 50 is provided with access hardware 52 (either preinstalled or retrofitted to an existing data processor or data processor system), which is in turn coupled to a capture block 53. The illustrative capture block 53 includes one or more selecting/sampling blocks 54 and a control block 56. Like above, and in some embodiments, the one or more selection/sampling blocks 54 and the control block 56 may be at least in part controlled by the monitoring computer or device 58. A second processor 60 is also provided in the illustrative embodiment with access hardware 62, which is in turn coupled to a capture block 63. The illustrative capture block 63 also includes one or more selecting/sampling blocks 64 and a control block 66. The selecting/sampling blocks 64 and/or control block 66 may also be controlled at least in part by the monitoring computer or device 58, if desired.

In some illustrative embodiments, each control block 56 and 66 may be coupled to a different port of the monitoring computer or device 58, which can then simultaneously receive data from both control blocks 56 and 66. Alternatively, each control block 56 and 66 may be coupled to a common port of the monitoring computer or device 58 via, for example, a bus, hub, and/or switch, as desired. The monitoring computer or device 58 may then be adapted to receive data from multiple control blocks 56 and 66 across the bus, hub and/or switch. The data processors 50 and 60 may, for example, be separate processors within a single multiprocessor machine, or may be CPUs in different machines.

Figure 5:
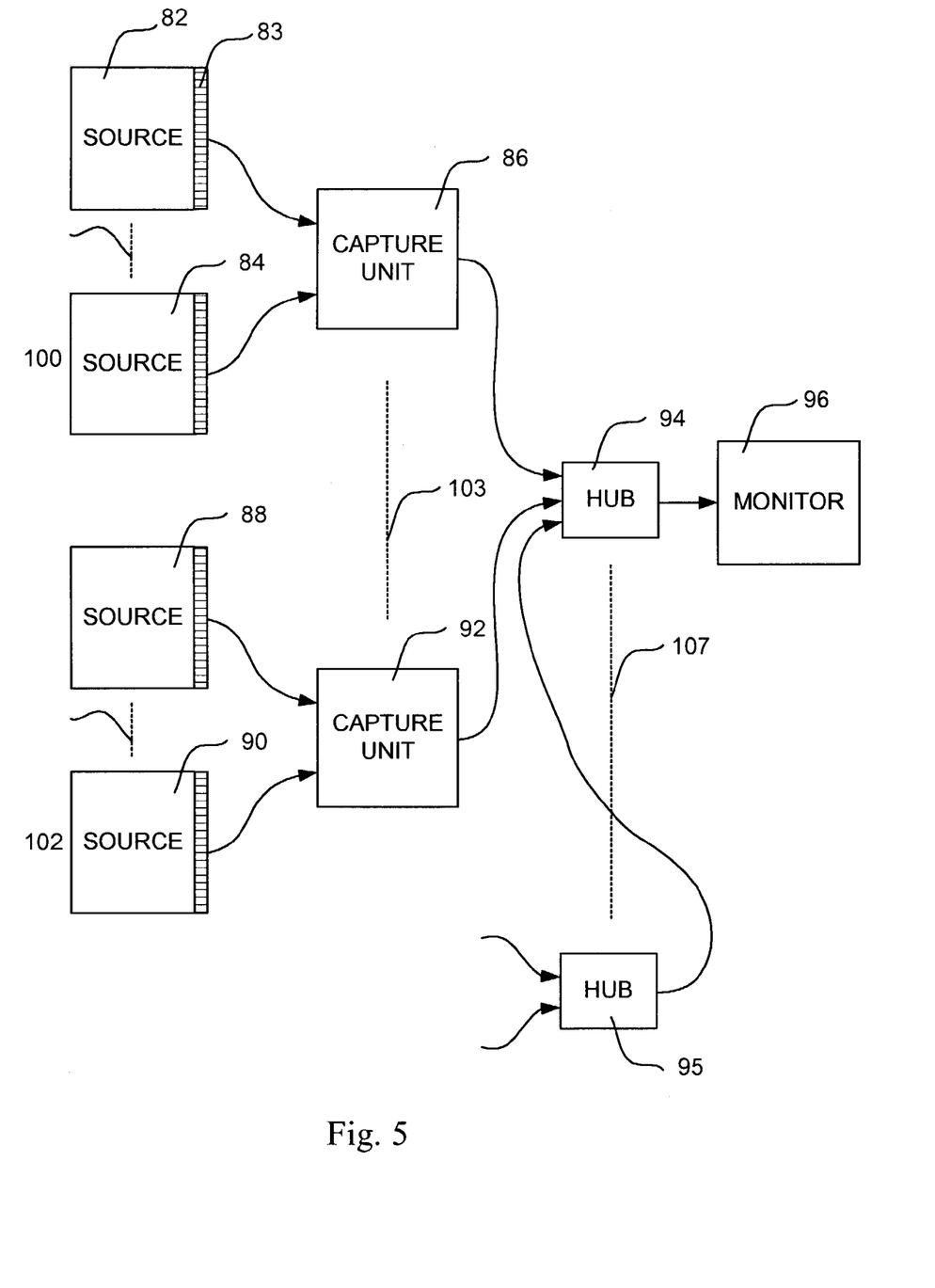
FIG. 5 is a block diagram showing another illustrative embodiment of the present invention.

FIG. 5 is a block diagram showing another illustrative embodiment of the present invention. In this illustrative embodiment, a first event source 82 and a second event source 84 are coupled to a first capture device 86. The first event source 82 and the second event source 84 may each be, for example, one or more processors, main memory, cache memory, internal or external busses, I/O channels, etc. The dashed line 100 indicates that any number of event sources may be coupled to the first capture device 86, which provides a first level of scalability to the system. Likewise, a third event source 88 and a fourth event source go are coupled to a second capture device 92. The third event source 88 and the fourth event source 84 may each be, for example, one or more processors, main memory, cache memory, internal or external busses, I/O channels, etc. The dashed line 102 indicates that any number of event sources may also be coupled to the second capture device 92, as desired. As detailed above, an access element such as access element (AE) 83, may be provided as an interface between selected nodes of the various event sources and the corresponding capture devices, as desired.

The illustrative capture devices may include one or more selecting/sampling blocks, which may be used to select and/or sample data from the corresponding event sources. The first capture device 86 and the second capture device 92 are shown coupled to a hub 94. Dashed line 103 indicates that any number of capture devices may be coupled to hub 94, which provides a second level of scalability, as desired. The hub 94 is then coupled to a monitoring device 96. The monitoring device 96 may be adapted to receive data from multiple capture devices 86 and 92 via the hub 94. Also, more than one hub, including hub 95, may be provided with each hub connected to a number of capture devices. Dashed line 107 indicates that any number of hubs may be used, as desired As can be seen, the illustrative embodiment may provide a portable and scalable performance monitoring system. In a preferred embodiment, the first capture device 86, the second capture device 92, the hub 94 and the monitoring device 96 are portable in nature, allowing a technician to carry the devices to a desired site. The technician may then plug the capture devices into various parts of a system or multiple systems, and monitor the performance of the various parts of the system or multiple systems via the monitor device 96. Because of its portable nature, the system may be transported and used at different sites, as desired.

Figure 6:
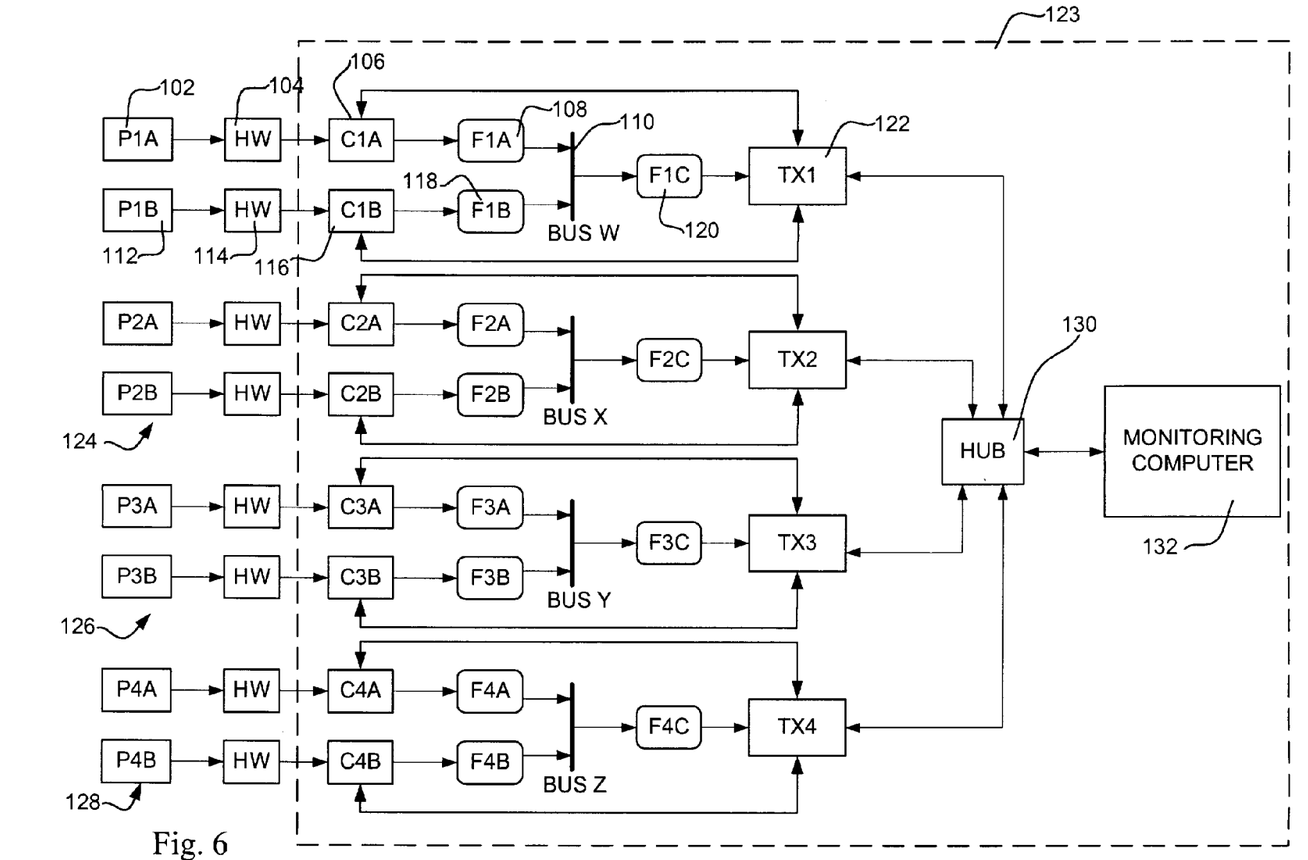
FIG. 6 is a schematic representation of yet another illustrative embodiment of the present invention.

FIG. 6 is a schematic representation of an illustrative monitoring system for four dual-processor data processing systems 100, 124, 126, 128. In the illustrative embodiment, dual processor system 100 includes a first processor 102 and a second processor 112. Processors 102 and 112 are provided with access hardware 104 and 114, respectively, which may access nodes or registers within the processors 102 and 112. In the illustrative embodiment, each access hardware element 104 and 114 is provided with a capture device 106 and 116, respectively, which may include sampling devices for sampling data, as described above. In this embodiment, the capture devices 106 and 116 may be coupled to memory devices such as FIFO devices 108 and 118. The FIFO devices 108 and 118 may be coupled to a bus such as BUS W 110. BUS W 110 is coupled to another memory device such as FIFO 120, which then is coupled to a communications device 122 for transmitting data either via wire, optical, or wireless transmission to a hub 130. In some embodiments, the capture devices 106 and 116, the FIFO devices 108 and 118, the BUS W 110, the FIFO 120 and the communications TX block 122 may be considered a single capture device generally.

Hub 130 is coupled to a monitoring computer or device 132. In one embodiment, the hardware shown in block 123 is provided external to the four dual-processor data processing systems, and is made portable for use in monitoring the performance of computer systems by computer service personnel. Hub 130 may also be coupled to a number of communications devices, such as communications TX block 122, that correspond to several other dual processor systems 124, 126, 128, as shown. The hub 130 and, for example, the communications devices 122 as well as the monitoring computer or device 132 may be adapted to USB data transmission, though other serial and/or parallel data transmission protocols and devices may be used, as desired.

The monitoring system of FIG. 6 is scalable in several ways. For example, BUS W 110 is shown coupled to only capture devices 106 and 116. However, in other embodiments, BUS W 110 may be coupled to any number of capture devices, and the inputs themselves may vary in size and/or format. Furthermore, more or less communication devices 122 may be coupled to monitoring computer 132. In some cases, multiple hubs such as hub 130 may be connected to a single monitoring computer or device 132, or, in another embodiment, more than one level of hubs may be used as shown in FIG. 5. For example, in a multi-level hub system, a first hub is connected to a number, for example eight, lower level hubs, which may in turn each connect to a number of individual communications devices (TX). In some embodiments, sampling rates, sampling duration, and types of data sampled may vary as the system is scaled, for example, performance of a particular computer may be sampled for a shorter duration when ten computers are monitored than if only one particular computer is monitored.

In the illustrative embodiment of FIG. 6, the monitoring computer may send control data via the hub 130 to each of the communications devices such as communications device 122. Communications device 122 may be adapted to further relay data or instructions to the capture devices 104 and 114, or may be adapted to control aspects of the bus 110 operation or any of the memory devices such as FIFO devices 108, 118, and 120. In effect, the system may allow the monitoring computer or device 132 to distribute control data to lower levels of the monitoring system, using devices including the communications device 122 and the capture devices 106 and 116. In one illustrative embodiment, this may allow, for example, multiple capture devices using different communications devices 122 to be synchronized so that the data that is sampled is also synchronized across multiple data processors. For example, the monitoring computer 132 may instruct selected capture devices to begin monitoring instruction execution or other parameter or data at a certain sample begin time or in response to a certain trigger event. This may be beneficial for capturing samples (or short traces captured at specified intervals) that match up across data processor/data nodes in a multi-processor system, which may be useful in helping to understand what the whole system is doing at any point in time.

The inclusion of multiple layers of data buffering including FIFO devices 108, 118 and 120 may help the data to be safely buffered and controlled, preventing input buffer overruns in the monitoring computer or device 132, particularly when multiple processors are being simultaneously monitored. The hub 130 further aids in data control, by providing additional data management capabilities to the overall system.

These various intermediate levels of data control may also allow the monitoring computer 132 to be chosen from general purpose devices, for example, by simply loading a software program on the monitoring computer or device 132. Further, because the monitoring computer or device 132 need not be a dedicated device only useful as a performance monitor, a technician may reduce the costs of performance monitoring by being able to use virtually any computer as the monitoring computer or device 132 once the correct software is loaded. Likewise, updating the monitoring system to provide new uses or utilities is simplified, as new software or settings can be readily and cheaply distributed, while new hardware may be more expensive and slower to distribute.

Figure 7:
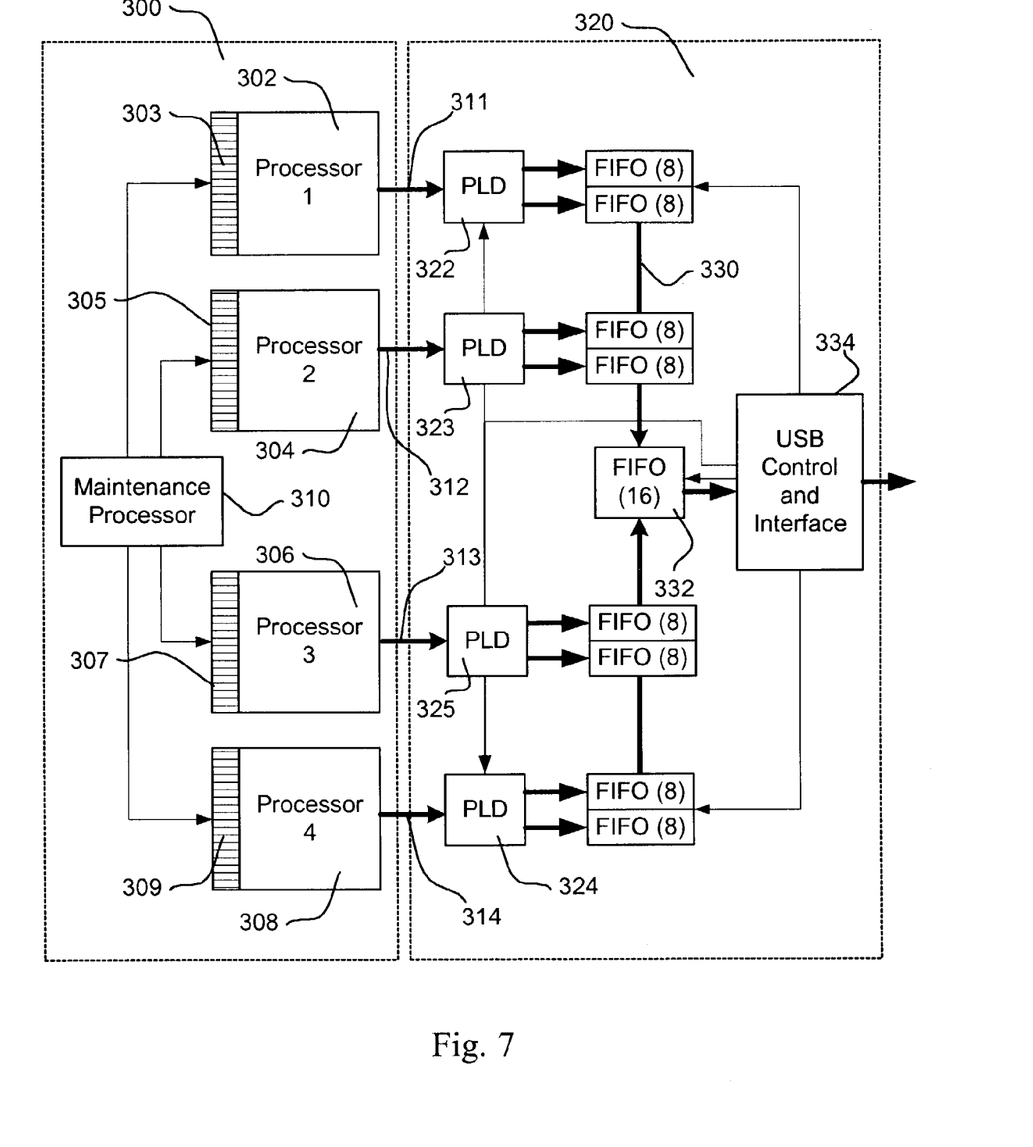
FIG. 7 is a schematic representation of another illustrative embodiment of the present invention.

FIG. 7 is a schematic representation of another illustrative embodiment of the present invention. In the example shown, the illustrative embodiment of FIG. 7 is used to monitor a Unisys™ 2200 computer 300, which includes four IPs 302, 304, 306, 308 and a maintenance processor 310. Each IP 302, 304, 306, 308 includes an access element 303, 305, 307, 309, respectively, for accessing selected nodes and/or registers in the corresponding IP 302, 304, 306, 308. Each access element provides an output on a 68 pin SCSI interface 311, 312, 313, and 314, each providing selected performance data as determined by the maintenance processor 310.

A capture device generally shown at 320 is provided that includes, for example, four programmable logic devices (PLD) 322, 323, 324 and 325, each coupled to one of the SCSI interfaces 311, 312, 313 and 314. Each PLD 322, 323, 324 and 324 provides an input to a pair of eight bit FIFO devices, as shown. By using a pair of eight bit FIFOs, rather than a single 16 bit FIFO, the capture device 320 may support double data rate capture, such as when the input data over the SCSI interface changes on both the rising and falling edges of the clock. During a rising edge of the clock, the input data may be stored in one of the eight bit FIFOs, and during the falling edge of the clock, the input data may be stored in the other one of the eight bit FIFOs. In one embodiment, the double data rate is an option that can be turned on and off by the user through the monitoring computer. In non-double data rate modes, the pair of eight bit FIFO devices may perform like a single 16 bit FIFO. The data from each pair of eight bit FIFOs is passed to a main FIFO 332, and the USB Control and Interface Block 334 controls the delivery of this data to a monitoring computer (not shown).

The operations of the capture device 320 are preferably controlled through a USB Control and Interface block 334, which includes both data control and an interface for allowing a USB cable to be attached to the capture device 320. The USB Control and Interface Block 334 may control various aspects of the PLDs 322, 323, 324 and 325, including, for example, sample rate, sample content, and the like. Such control can be provided by a monitoring computer or device (not shown) connected via a USB cable to the USB Control and Interface block 334, allowing external control of data separate from the maintenance processor 310, if desired.

Figure 8:
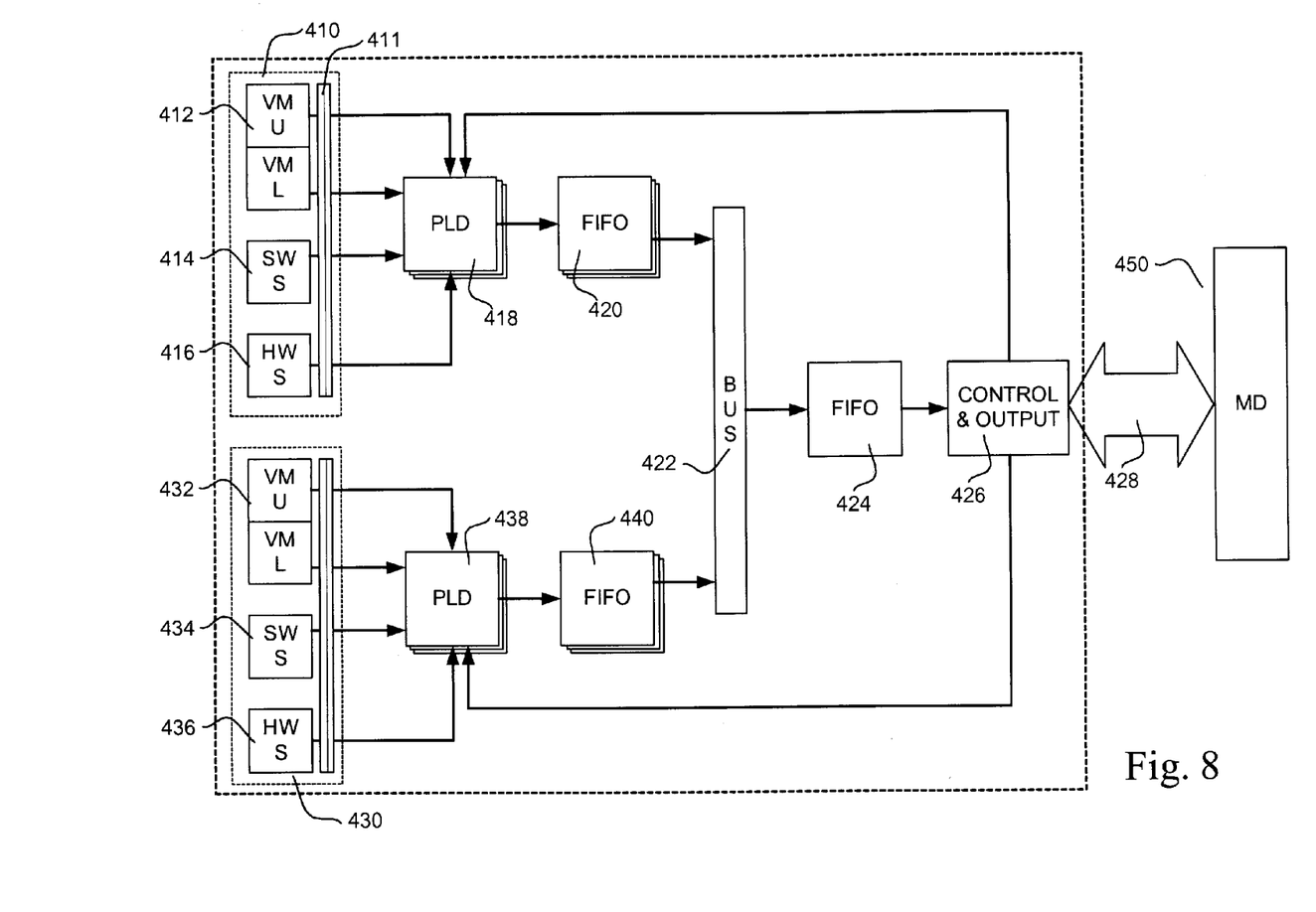
FIG. 8 is a schematic representation of yet another illustrative embodiment of the present invention.

FIG. 8 is a schematic representation of another illustrative embodiment of the present invention. In the illustrative embodiment, a first processor 410 includes one or more access element such as access element 411 to monitor virtual memory 412, software state 414, and hardware state 416, each of which is coupled into one or more PLDs 418. The number of PLDs 418 may depend on the number of access points to be monitored, and may be scalable as desired. Notably, and in the illustrative embodiment, the virtual memory 412 is an address containing sixteen bits, while the states 414 and 416 are each eight bits. The one or more PLDs 418 feed data to one or more FIFOs 420, each of which may be a pair of eight bit FIFO devices or a single sixteen bit FIFO, for example, as described above. FIFOs 420 may be coupled to a bus line 422 which provides data to a second level FIFO 424, if desired. The second level FIFO 424 is coupled to the control and output block 426. Control and output block 426 regulates the output of data from the second level FIFO 424 to a monitoring computer or device 450, preferably via two way communications link 428. Control and output block 426 may also control the one or more PLDs 418, if desired.

For a second controller 430, similar data 432, 434, 436 is captured and fed to one or more PLDs 438 and one or more FIFOs 440 onto bus 422, in a similar way to that of the first controller 430. The monitoring computer or device 450 may be a general purpose computer having monitoring software installed. In another embodiment, the monitoring computer or device 450 may be, for example, a microcontroller with some memory and programming functions and may be a dedicated device. It is not necessary for monitoring device 450 to be a computer having a wide range of functionality, although such general applicability of monitoring device 450 is also possible.

In the system of FIG. 8, for example, the virtual memory 412, 432 may be a secondary consideration of the overall device. For example, the aim of the system may be to provide periodic information relating to the software states 414 and 434 and hardware states 416 and 436. Thus, each PLD 418 and 438 may be directed by control and output bock 426 to sample the software states 414 and 434 and hardware states 416 and 436 at intervals, for example, every eight clock cycles, such that the PLDs 418 and 438 sends new information to the FIFOs 420 and 440 every eight clock cycles. Then, the bus 422 and second level FIFO 424 may be updated at a higher sample rate in order to keep up with the rate of data capture by the PLDs 418 and 438 in the lower level.

In a preferred embodiment, the PLDs 418 and 438 do not distinguish between software, hardware and/or any other similar states. Rather, the PLDs 418 and 438 are instructed when to sample, when to trigger a sample, how long to sample, etc. The stream of data sampled by the PLDs 418 and 438 is fed back to the monitoring computer, which then interprets the data and gives it meaning.

Alternatively, however, the PLDs 418 and 438 may be adapted to recognize when a certain software and/or hardware state is entered. For example, if software state 414 of the first processor 410 enters a specified state, one or more of the PLDs 418 may change modes to send out information on the virtual memory address 412 every other clock cycle until a particular virtual memory address 412 appears. Thus, the data sent forward may change in response to the software state 414 encountered for some period of time determined by the processor 410. After the particular memory address 412 is accessed, the one or more PLDs 418 may revert to an original monitoring procedure or to another monitoring procedure. Such a process allows a computer engineer to monitor the procedures of the processor 410 after the predetermined state is entered until an identified endpoint, in this case, access of a particular virtual memory location.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method for monitoring the performance of at least two data processing elements, the method comprising the steps of:
   providing a portable performance monitoring system that includes two or more capture devices and at least one monitoring device;
   releasably connecting a first one of the two or more capture devices to a first one of the data processing elements, the first capture device capturing performance monitoring data related to the first data processing element;
   releasably connecting a second one of the two or more capture devices to a second one of the data processing elements, the second capture device capturing performance monitoring data related to the second data processing element;
   sending the performance monitoring data captured by the first capture device to the monitoring device;

sending the performance monitoring data captured by the second capture device to the monitoring device;

analyzing at least some of the performance monitoring data received from the first and second capture devices via the monitoring device;

providing an output; and disconnecting the first capture device from the first data processing element, and disconnecting the second capture device from the second data processing element.

2. A method according to claim 1 further comprising the step of sampling selected performance monitoring data from at least one of the data processing elements.

3. A method according to claim 1 further comprising the step of temporarily storing selected performance monitoring data from at least one of the data processing elements before sending the performance monitoring data to the monitoring device.

4. A method according to claim 1 wherein the sending step sends the performance monitoring data captured by the capture devices to the monitoring device via a bus.

5. A method according to claim 1 wherein the sending step sends the performance monitoring data captured by the capture devices to the monitoring device via a hub.

6. A method according to claim 1 wherein the step of providing an output includes providing a real or near real-time output.

7. A method according to claim 1 further comprising the step of selecting from which of the capture devices that performance monitoring data is sent to the monitoring device.

8. A method according to claim 1 further comprising:

delivering the portable performance monitoring system to the data processing system prior to the releasably connecting steps; and delivering the portable performance monitoring system to another data processing system after the disconnecting step.

9. A method for monitoring performance of a number of data processing elements, the method including:

capturing data from selected nodes of two or more data processing elements using two or more data capture devices;

caching selected data obtained from each data capture device in a first level cache;

caching selected data obtained from two or more data capture devices provided by the first level cache in a second level cache; and transferring selected data from the second level cache to a monitoring device.

10. A system for monitoring the performance of one or more nodes of a data processing element, the system comprising:

an access element for each of the one or more nodes or sets of nodes to be monitored, each access element providing a hardware interface to transfer data;

a number of portable capture devices, wherein each of the access elements is electrically coupled to a portable capture device;

a number of communication facilitating elements, each communication facilitating elements coupled to two or more capture devices; and a monitoring device coupled to two or more communication facilitating elements.

\* \* \* \* \*